United States Patent [19]

Kullen

[11] 4,440,332

[45] Apr. 3, 1984

[54] REINFORCED BICYCLE PACK

[76] Inventor: Thomas W. Kullen, 848 E. Bryan Ave., Salt Lake City, Utah 84105

[21] Appl. No.: 454,835

[22] Filed: Dec. 30, 1982

[51] Int. Cl.$^3$ .............................................. B62J 7/06
[52] U.S. Cl. .................................... 224/36; 224/30 A; 224/41
[58] Field of Search .................... 224/30 A, 33 A, 36, 224/41, 31

[56] References Cited

U.S. PATENT DOCUMENTS

| 4,056,219 | 11/1977 | Hine, Jr. ............................... | 224/36 |
| 4,260,086 | 4/1981 | Hine, Jr. et al. .............. | 224/30 A X |
| 4,315,583 | 2/1982 | Hine, Jr. ........................ | 224/30 A X |

Primary Examiner—Steven M. Pollard
Attorney, Agent, or Firm—Joseph S. Iandiorio

[57] ABSTRACT

A reinforced bicycle pack includes a bag having a back, front, top, bottom and two sides, with a sleeve on each side extending from the back bottom area toward the front top area. The support frame has a lateral portion extending along the back top of the bag and leg portions which extend downwardly toward the bottom of the bag. The two leg portions end in two angled portions which extend from the back bottom area toward the front top area of the bag. One of the leg portions is received in each of the sleeves to support and erect the bag. There are means for attaching the lateral portion to the bag and for engaging the horizontal portion with the bicycle.

12 Claims, 3 Drawing Figures

REINFORCED BICYCLE PACK

FIELD OF INVENTION

This invention relates to an improved reinforced bicycle pack, and more particularly to such a pack in which a frame supports and reinforces the pack.

BACKGROUND OF INVENTION

In packs using traditional horizontal supports, the bag is hung on the support and has a tendency to swing or rock with the motion of the bicycle. This unwanted motion is most noticeable on quick stops and can be a serious hazard, especially when the packs are full and heavy. In addition, the bags tend to bulge beyond their normal geometrical shape when full and may encroach on other equipment, the bicycle parts or the rider's freedom. This is especially so when the pack is handlebar mounted and may intefere with the rider's access to the hand brakes or the maneuverability of the handlebars.

SUMMARY OF INVENTION

It is therefore an object of this invention to provide an improved, simple, lightweight reinforced bicycle pack.

It is a further object of this invention to provide such a reinforced bicycle pack which resists rocking and swinging motions independent of the bicycle.

It is a further object of this invention to provide such a reinforced bicycle pack which resists bulging and deforming when loaded.

It is a further object of this invention to provide such a reinforced bicycle pack with a support frame which both supports and reinforces the bag.

This invention results from the realization that a truly effective, lightweight and simple support frame for a bicycle pack which performs both as a mounting means for the bag and as a reinforcement to maintain the bag's shape and which resists rocking and swaying motions can be accomplished with a lightweight frame that has two angled portions which extend from the back bottom portion of the bag to the top front portion.

This invention features a reinforced bicycle pack including a bag having a back, front, top, bottom and two sides, and a sleeve on each side extending from the back bottom area toward the front top area. A support frame has a lateral portion extending along the back top of the bag and two leg portions extending downwardly toward the bottom of the bag. There are two angled portions continuing from the edge portions and extending from the back bottom area toward the front top area. One of the angled portions is received in each of the sleeves to support and erect the bag. There are means for attaching the lateral portion to the bag and means for engaging the lateral portion with the bicycle.

In a preferred embodiment, the back, front, top, bottom and sides are each generally rectangular in shape. The sleeves may be sewn on the sides. The means for attaching includes a flap attached to the bag and forming a passage to receive the lateral portion of the support frame. The flap means may be releasably attached at one end to enable insertion and removal of the lateral portion of the support frame. The flap means may include at least two separate flap elements.

The means for engaging may include an extension section from the lateral portion for engaging the frame of the bicycle. The extension section may include a loop for engaging the neck of the bicycle handlebars. The loop may extend slightly downwardly relative to the leg portions, and the loop may include a U-shaped distal portion for gripping the neck of the bicycle and a convex portion for resting on top of the handlebars. The bag may include ring means at the back bottom area at each side for receiving the ends of a tension cord, and the pack may further include a tension cord for engaging the bicycle frame and the ring means to hold the pack against the bicycle frame.

DISCLOSURE OF PREFERRED EMBODIMENT

Other objects, features and advantages will occur from the following description of a preferred embodiment and the accompanying drawings, in which.

Figure 1:
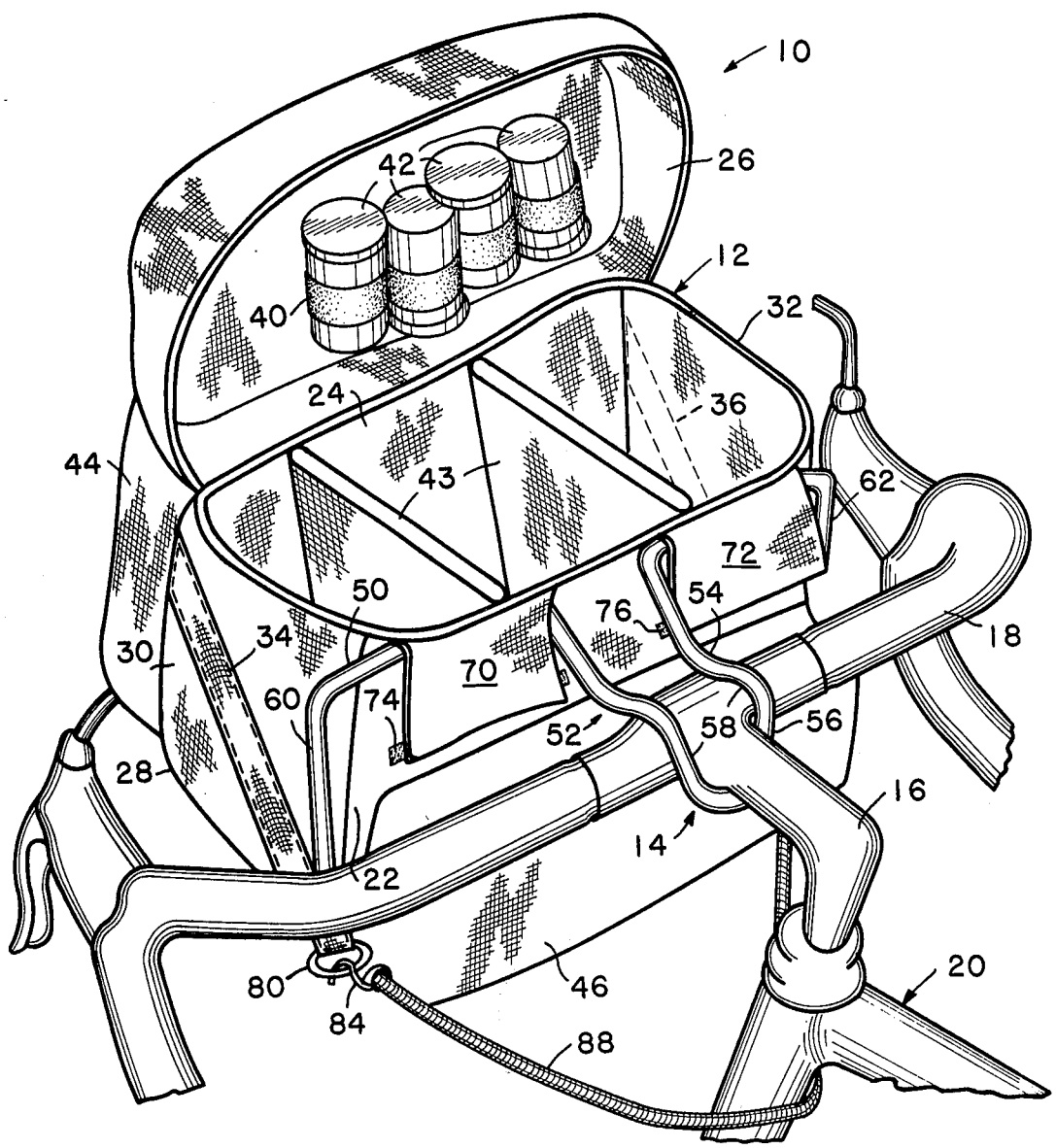
FIG. 1 is an axonometric view of a reinforced bicycle pack according to this invention mounted on the handlebars of a bicycle viewing from the rider's position.

There is shown in FIG. 1 a bicycle pack 10 according to this invention including a bag 12 and support frame 14 mounted on the neck 16 and handlebars 18 of bicycle 20. Bag 12 is typically made out of a nylon fabric such as CORDURA, stitched together at the various seams and provided with suitable zippers, VELCRO fasteners, or other closure means for its various covers and pockets. Bag 12 generally has a back portion 22, front portion 24, top portion 26, bottom portion 28, and two sides 30 and 32. On each of sides 30 and 32 there is provided a sleeve 34, 36, typically formed of nylon webbing which is stitched to sides 30 and 32, respectively.

Although thus far the back 22, front 24, top 26, bottom 28, and side 30, 32 portions are all shown as generally rectangular, but this is not a necessary limitation of the invention. For example, sides 30 and 32 may be generally triangular in shape, thereby reducing the bottom portion to a very small area or erasing the distinction completely so that the bottom portion 28 and the front portion 24, for example, merge and one piece of material performs the function of both bottom portion 28 and front portion 24, Regardless of how the bag is shaped, the various portions referred to will be present even though there may not be distinct panels and seams which easily define them.

The particular bag 12 in FIG. 1 is shown as having a recess in top portion 26 which contains a hold-down strap 40 such as for retaining film cans 42. Bag 12 may also include partitions 43 and additional external front pocket 44 and rear pocket 46.

Support frame 14 includes lateral portion 50, which in the embodiment shown in FIG. 1 also includes an extension portion 52 for gripping the bicycle frame. In this case, extension portion 52 includes a loop 54 having a U-shaped distal end 56, which engages the underside of bicycle neck 16, and convex portions 58 which receive beneath them handlebar 18. From lateral portion 50 there extend downwardly two leg portions 60, 62 which terminate at their lower ends in angled portions. These angled portions 64, 66 extend from the back bottom area to the top front area within sleeves 34 and 36, respectively, as shown more clearly in FIGS. 2 and 3.

There are some means for attaching the lateral portion 50 to the back top area of bag 12 in the embodiment of FIG. 1. Since lateral portion 50 is split by extension 52 the attaching means take the form of two separate flaps 70, 72, which at their upper end are fastened to the bag by traditional stitching means while at their lower end they are releasably attached to the bag by means of VELCRO strips 74, 76 in order to facilitate the introduction and removal of lateral portion 50 from the loops which those flaps form.

Figure 3:
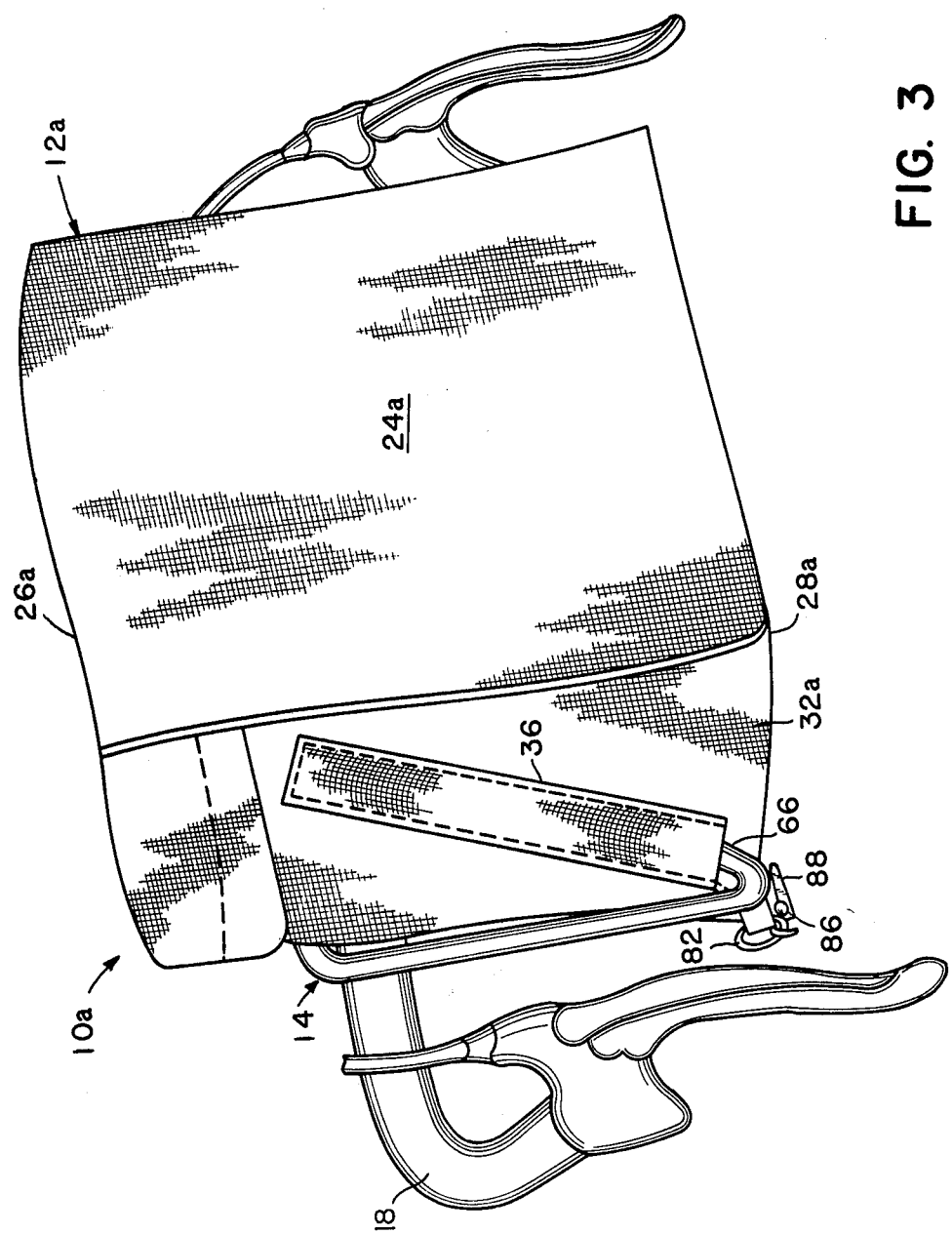
FIG. 3 is a view of a pack according to this invention with a slightly modified bag viewed from the front of the bicycle.

At the bottom back portion of bag 12 there are attached a pair of rings 80, 82, FIGS. 1 and 3, which engage with hooks 84, 86 on tension cord 88. Cord 88 extends around the frame of bicycle 20 to further secure pack 10 and hold it tightly in position against the bicycle frame and improve the resistance to swaying and rocking of pack 10.

Figure 2:
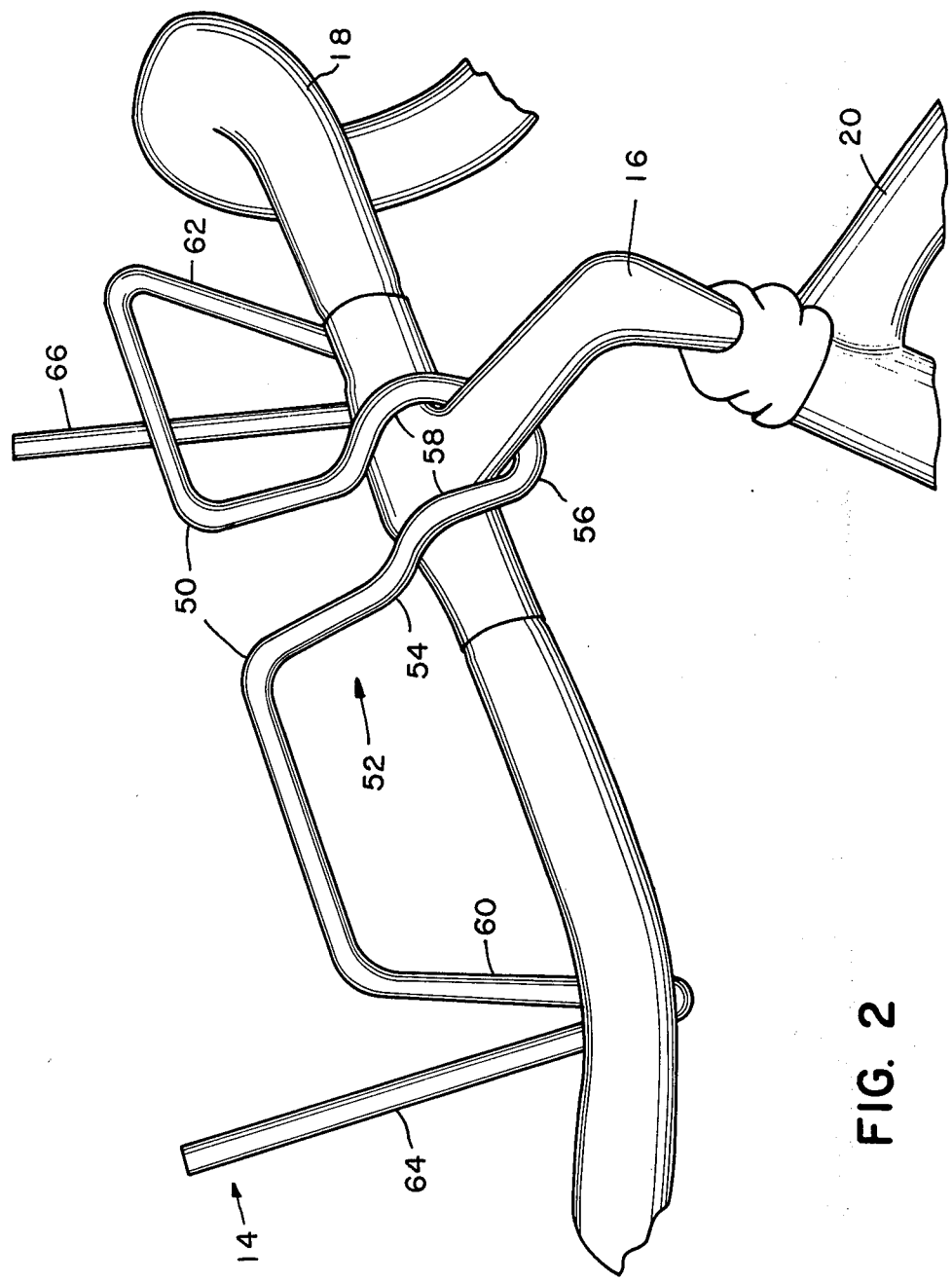
FIG. 2 is a view similar to FIG. 1 with the bag removed and only the support frame mounted on the bicycle.

Support frame 14 is shown to greater advantage and more clearly in FIG. 2, where it is shown with the bag removed attached to neck 16 and handlebars 18 of a bicycle with the bag removed. There can be seen the gentle upward incline of angled portions 54, 56 which is designed to receive the bag and permit it to drop downwardly and inwardly toward the bicycle to provide the utmost in stability and reinforcement. The angled portions 54 and 56 in sleeves 34 and 36 provide reinforcement for the bag and prevent it from bulging at sides 30, 32.

Leg portions 60, 62 are slightly angled with respect to extension 52. That is, if viewed from the side in profile the angle between the general direction of extension 52 and the general direction of legs 60, 62 is not a right angle but is somewhat less than ninety degrees. Thus if leg portions 60, 62 are characterized as being generally vertical then extension 52 will be characterized as extending slightly downwardly. While this is the general impression that one gets from viewing the bag sitting on a flat surface such as a table or a deck, when hung on the bicycle the extension takes on a more generally horizontal orientation while the leg portions 60, 62 appear to extend slightly backawardly rather than straight up and down. This angle increases the stability of the pack mounting on the bicycle and contributes to the pack's resistance to swaying and rocking, especially when combined with the use of tension cord 88 engaged with rings 80, 82 and the frame of the bicycle. Support frame 14 is made from extremely lightweight material, such as 6061-26 aircraft aluminum.

In FIG. 3, where like parts have been given like numbers and similar parts have given like numbers accompanied by a lower case a, the pack of this invention is shown with the bag somewhat modified. In bag 12a of pack 10a the front pocket 44 and rear pocket 46 have been eliminated.

Other embodiments will occur to those skilled in the art and are within the following claims:

What is claimed is:

1. A reinforced bicycle pack comprising:
    a bag having a back, front, top, bottom and two sides;
    a sleeve on each side extending from the back, bottom area toward the front, top area; and
    a support frame having a lateral portion extending along the back, top of the bag, two leg portions extending downwardly toward the bottom of the bag, and two angled portions extending from the back, bottom area toward the front, top area, one received in each of said sleeves to support and erect the bag;
    means for attaching said lateral portion to the bag; and
    means for engaging said lateral portion with the bicycle.

2. The pack of claim 1 in which said back, front, top, bottom and sides are each generally rectangular separate pieces.

3. The pack of claim 1 in which said sleeves are sewn on said sides.

4. The pack of claim 1 in which said means for attaching includes a flap means attached to said bag and forming a passage to receive said lateral portion.

5. The pack of claim 4 in which said flap means is releasably attached at one end to enable insertion and removal of said lateral portion.

6. The pack of claim 4 in which said flap means includes at least two separate flap elements.

7. The pack of claim 1 in which said means for engaging includes an extension section from said lateral portion for engaging the frame of a bicycle.

8. The pack of claim 7 in which said extension section includes a loop for engaging the neck of the bicycle handlebars.

9. The pack of claim 8 in which said loop extends slightly downwardly relative to said leg portions.

10. The pack of claim 9 in which said loop has a U-shaped distal portion for gripping the neck of the bicycle and a convex portion for resting on top of the handlebars.

11. The pack of claim 1 in which said bag includes ring means at the back, bottom area at each side for receiving the ends of a tension cord.

12. The pack of claim 11 in which said pack includes a tension cord for engaging the bicycle frame and said ring means to hold the pack against the bicycle frame.

* * * * *